UNITED STATES PATENT OFFICE.

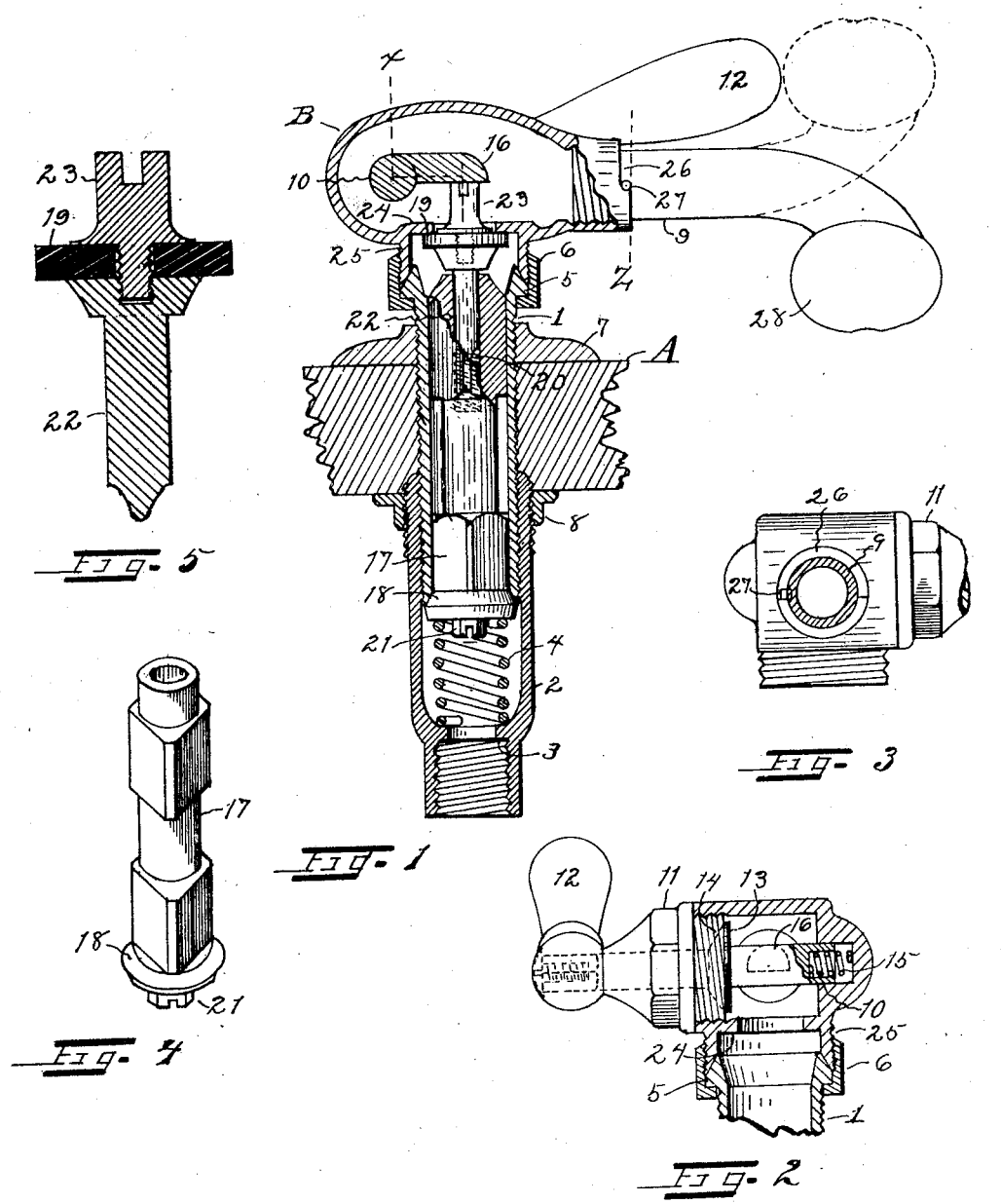

FRED P. ANGELL, OF BATTLE CREEK, MICHIGAN.

DUAL VALVE FOR HYDRANTS.

1,411,259.  Specification of Letters Patent.  Patented Apr. 4, 1922.

Application filed February 11, 1920. Serial No. 357,886.

*To all whom it may concern:*

Be it known that I, FRED P. ANGELL, a citizen of the United States, residing at Battle Creek, in the county of Calhoun and State of Michigan, have invented certain new and useful Improvements in Dual Valves for Hydrants, of which the following description, taken in connection with the appended claims and accompanying drawings, forms the specification.

The present invention relates to that class of valves operating against fluid pressure, and in which a primary valve operates in conjunction with a check valve for the purpose.

A characteristic feature and important object of the present invention is a means for insuring the seating of valves regardless of fluid pressure passing through the same. The significance is of importance where several hydrants lead from a common pipe line and especially where the hydrants are located one above the other, as in buildings of several stories. A hydrant using near or full capacity of a pipe antecedent to other hydrants on the same line causes a lessening of pressure on such hydrants, and unless some automatic means is provided to keep the valves closed under such circumstances, leakage and waste of water will result when pipes are not at capacity pressure.

Other objects and features of the invention are: to so construct both the primary and check valves as to insure perfect seating; to obviate the necessity of a packed joint about the operating spindle; and to so construct the nozzle that the same may be used for a drinking fount. These and other objects and advantages will hereinafter appear to those familiar with and skilled in the art to which this invention appertains.

In the drawings forming a part of this specification, Figure 1 is a side sectional elevation of my improved dual valve closed, the dotted lines indicating the nozzle turned upwardly as a drinking fount.

Fig. 2 is a rear elevation broken in section on the line $x$ of Fig. 1, showing the operating spindle mechanism.

Fig. 3 is a cross section of the nozzle on the line $z$ of Fig. 1.

Fig. 4 is an enlarged detail view of the valve-operating guide.

Fig. 5 is an enlarged vertical section of the primary valve.

I have shown the invention as constructed for use on sinks and the like where vertical hydrants are commonly used, although the same is not necessarily limited to such usages, as it would be evident that a horizontal construction would work to equal advantage.

Like marks of reference refer to corresponding or equivalent parts in the different views, in which A represents a sink or other frame or top through which the shank or main barrel 1 of the faucet is anchored. As shown, the lower end of this barrel is exteriorly screw-threaded and receives the interiorly screw-threaded upper end of an exteriorly threaded union 2. This union at its lower end is reduced and is also screw-threaded (either interiorly or exteriorly) to receive a conducting pipe, the union near its lower end forming an internal annular shoulder 3 for the seating of a coil spring 4, the object of which will be more fully described hereinafter.

The upper end of the barrel 1 is burred outwardly and forms a rim 5 against which an interiorly screw-threaded collar 6 is fitted and into which a neck of the hydrant head B is screw-threaded.

As shown, the upper clamping or seating collar 7 is screw-threaded on to the upper end of the barrel 1, and immediately below the burred rim of said barrel, which, together with a secondary collar 8, screw-threaded over the union 2, clamps the hydrant to a sink or other fixture, as "A."

The head B is formed with a transversely arranged housing and is slightly offset on the side of the barrel 1 opposite to the nozzle 9, and within this housing the operating spindle 10 is journalled. This housing at one end is closed and bored out and forms a bearing for the inner end of the spindle 10, the opposite end of the spindle passing through a packing nut 11 screw-threaded into the open side of said offset housing, the spindle at its free outer end being squared and fitted with a handle 12, the same being secured in any suitable manner.

The spindle 10 at a point antecedent to passing through the nut 11 is tapered and forms a cone 13 bearing into a correspondingly formed opening or seat 14 in the nut 11, and its opposite bored-out or chambered end is provided with a coil spring 15 seating against the closed head of the offset housing and keeps the cone bearing 13 water tight in the nut 11.

An arm 16 extends from the spindle 10 and overhangs the barrel 1 for the purpose of operating the valve mechanism within the same. This mechanism comprises a guide 17, a cone valve 18 at its lower end, the coil spring 4, the primary valve 19 and its seating spring 20 within a chamber in the upper end of the guide 17. The guide 17 is squared at its ends and for a portion of its length and is somewhat reduced between its extremities to permit water or other fluid to freely pass through the hydrant when the valves are opened; the lower end of the same is turned and forms the cone valve 18 seating within a correspondingly-formed valve seat at the lower end of the barrel 1. The lower end 21 of the guide 17 is extended below the valve 18 and slotted to receive a screw driver for the purpose of renewing or grinding the surfaces between the valve and its seat by the use of oil and emery or other abrasive material.

The spring 4 within the union 2 at its upper end bears against the valve 18 and insures the seating of the valve 18 and the primary valve 19, either with or without fluid pressure in the hydrant and also prevents the clattering of one or both valves, and the wearing of their seats, a feature often noted in hydrant and other valve mechanism.

The upper end of the guide 17 is chambered sufficiently deep to receive the coil spring 20 between the bottom of the chamber and the lower end of a stem 22 to which the valve 19 is attached. This valve is of rubber, leather or other suitable material and lies between a shoulder formed at the upper end of the stem 22 and a shoulder of a screw 23 screw-threaded into said stem, the upper end of the screw forming a stem extending through an indrawn neck portion 24 of the housing B, and forms a vlave seat for the valve 19. The stem is located at the extremity and below the tip of the overhanging arm 16 of the operating spindle 10.

To insure a perfect fluid tight joint without the use of fibre or other resilient material, or soft metal packing, the neck 25 of the housing B is bored out flaring and the rim 5 of the barrel 1 tapered to fit within the same so that when the collar 6 and the neck of the housing are screwed together, the flaring joint formed by the parts will render the union both gas and liquid tight.

Under ordinary or normal conditions the valve 19 when seated is slightly spaced from the head or upper end of the guide 17 when the valve 18 of said guide is seated, the seating of the valve 19 being insured by means of the coil spring 20, this spring being sufficiently strong to seat the valve 19 yet not affecting the primary seating spring 4 located in the union 2, the latter being of sufficient power to elevate and cause the valves to set and also raise the actuating arm 16 together with its operating handle.

The nozzle 9 is screw-threaded where it joins with a reduced portion of the head B, the same having a slot 26 formed at its end, and the nozzle is provided with a stud 27 which operates in the slot for the purpose of limiting the turning of the nozzle beyond a predetermined point, the limiting points being such that the nozzle may be directed in an upward and a downward position, the former for the purpose of using the same for a drinking fount, the latter as a faucet for general usages. The nozzle at its curved end is formed with a bulbular head 28 and it may be provided with a baffle plate, ball or other obstruction for preventing a direct forceful current of water from leaving the same, a feature desirable especially when used as a drinking fount. Hydrants of the character are especially desirable and useful in buildings of several stories where water is taken from the same pipe line, not alone for the reason of being perfectly self sealing under pressure or no pressure, but also for the convenience of being readily repaired above the sub-valve without cutting off the water supply.

I am aware that hydrants have been made in which two valves are employed operating against liquid pressure, but I am not aware of a hydrant being used in which the valves were operative independent of liquid pressure or self sealing.

From the foregoing explanation of the arrangement and construction of the valves as used for a vertical hydrant, taken in connection with the accompanying drawings, a more extended explanation of its workings and advantages is believed to be unnecessary.

Having, therefore, set forth the objects and advantages of my improved dual valve for hydrants, what I claim as new and desire to secure by Letters Patent, is:—

1. In a device of the class set forth, the combination of a barrel, a union forming an indrawn seat at its lower end screw-threaded on the lower end of said barrel, and a nozzle head having an indrawn neck opening forming an underlying valve seat coupled to the upper end of said barrel, a guide longitudinally operative within said barrel, said guide having a sub valve at its lower end being adapted to seat against the lower end of said barrel and formed at its upper end with a bored-out chamber, a coil spring seating in said chamber, a primary valve having a stem operative within said chamber and abutting on said spring, said valve being adapted to seat against the valve of said indrawn neck opening, a coil spring interposed within said union between the sub valve on said guide and the indrawn seat of said union, and means to unseat said initial valve and said sub-valve, successively, substantially as set forth.

2. In a device of the class set forth, the combination of a barrel, a union forming an indrawn seat at its lower end screw-threaded on the lower end of the barrel, and a nozzle head having an indrawn neck opening forming an underlying valve seat coupled to the upper end of said barrel, a guide longitudinally operative within said barrel, an initial valve independently fitted in the upper end of said guide, and a spring interposed between said valve and said guide.

FRED P. ANGELL.

Witnesses:
F. G. EVANS,
P. J. ROSS.